United States Patent
Yang et al.

(10) Patent No.: US 10,887,772 B2
(45) Date of Patent: Jan. 5, 2021

(54) SIGNAL TRANSMISSION METHOD AND APPARATUS

(71) Applicant: Huawei Technologies Co., Ltd., Shenzhen (CN)

(72) Inventors: Jianjun Yang, Shenzhen (CN); Jie Sun, Shenzhen (CN); Junfeng Xiao, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 134 days.

(21) Appl. No.: 15/880,773

(22) Filed: Jan. 26, 2018

(65) Prior Publication Data

US 2018/0152847 A1 May 31, 2018

Related U.S. Application Data

(63) Continuation of application No. PCT/CN2016/091837, filed on Jul. 27, 2016.

(30) Foreign Application Priority Data

Jul. 28, 2015 (CN) .......................... 2015 1 0449578

(51) Int. Cl.
*H04W 16/14* (2009.01)
*H04B 1/403* (2015.01)
(Continued)

(52) U.S. Cl.
CPC .......... *H04W 16/14* (2013.01); *H04B 1/0053* (2013.01); *H04B 1/406* (2013.01);
(Continued)

(58) Field of Classification Search
CPC combination set(s) only.
See application file for complete search history.

(56) References Cited

U.S. PATENT DOCUMENTS 8,848,676 B1 9/2014 Wheeler et al.
9,002,282 B1* 4/2015 de la Broise ............ H04B 1/40
455/63.1

(Continued)

FOREIGN PATENT DOCUMENTS

CN 204119535 U 1/2015
CN 104780544 A 7/2015
(Continued)

OTHER PUBLICATIONS

Qualcomm Technologies, Inc., "Qualcomm Research LTE in Unlicensed Spectrum: Harmonious Coexistence with Wi-Fi," Jun. 30, 2014, 19 pages.

*Primary Examiner* — Zhitong Chen
(74) *Attorney, Agent, or Firm* — Slater Matsil, LLP

(57) ABSTRACT

Embodiments of the present invention disclose a signal transmission method and apparatus. The apparatus includes an LTE-U processing unit, a Wi-Fi processing unit, an antenna unit, and a coupling apparatus. After receiving an LTE-U signal sent by the LTE-U processing unit, the coupling apparatus divides the LTE-U signal into a first LTE-U signal to be sent to the antenna unit and a second LTE-U signal to be sent to the Wi-Fi processing unit, so that the Wi-Fi processing unit does not send a Wi-Fi signal; and after receiving a Wi-Fi signal sent by the Wi-Fi processing unit, the coupling apparatus divides the Wi-Fi signal into a first Wi-Fi signal to be sent to the antenna unit and a second Wi-Fi signal to be sent to the LTE-U processing unit, so that the LTE-U processing unit does not send an LTE-U signal.

20 Claims, 10 Drawing Sheets

(51) Int. Cl.
*H04W 72/12* (2009.01)
*H04B 1/00* (2006.01)
*H04W 74/08* (2009.01)
*H04W 88/06* (2009.01)
*H04W 88/10* (2009.01)

(52) U.S. Cl.
CPC ... *H04W 72/1215* (2013.01); *H04W 74/0808* (2013.01); *H04W 88/06* (2013.01); *H04W 88/10* (2013.01)

(56) References Cited

U.S. PATENT DOCUMENTS

| | | |
|---|---|---|
| 2009/0170447 A1 | 7/2009 | Marlett et al. |
| 2009/0257379 A1 | 10/2009 | Robinson et al. |
| 2009/0285135 A1* | 11/2009 | Rousu ................. H04B 1/0057 370/297 |
| 2016/0337101 A1 | 11/2016 | Gao et al. |
| 2016/0345345 A1* | 11/2016 | Malik ................... H04W 48/04 |
| 2017/0105125 A1 | 4/2017 | Tabet et al. |
| 2017/0105218 A1 | 4/2017 | Tabet et al. |

FOREIGN PATENT DOCUMENTS

| | | |
|---|---|---|
| CN | 104796218 A | 7/2015 |
| EP | 1729463 A1 | 12/2006 |
| JP | 2015149723 A | 8/2015 |
| TW | 201524167 A | 6/2015 |
| WO | 2013174800 A1 | 11/2013 |
| WO | 2015023538 A1 | 2/2015 |
| WO | 2015084662 A1 | 6/2015 |
| WO | 2015085280 A2 | 6/2015 |
| WO | 2015190619 A1 | 12/2015 |

\* cited by examiner

SIGNAL TRANSMISSION METHOD AND APPARATUS

CROSS-REFERENCE TO RELATED APPLICATIONS

This application is a continuation of International Application No. PCT/CN2016/091837, filed on Jul. 27, 2016, which claims priority to Chinese Patent Application No. 201510449578.X, filed on Jul. 28, 2015. The disclosures of the aforementioned applications are hereby incorporated by reference in their entireties.

TECHNICAL FIELD

The present invention relates to the field of wireless communications technologies, and specifically, to a signal transmission method and apparatus.

BACKGROUND

With rapid development of wireless communications technologies, a Wireless Fidelity (Wi-Fi) technology and a cellular technology have become two most successful wireless technologies. With the Wi-Fi technology, an operator can deploy, by using a free 5 GHz unlicensed frequency band, a wireless local area network (WLAN) for cellular network offloading, to reduce communication load of a cellular network.

In addition, to deal with impact of Wi-Fi industry on cellular industry, the 3rd Generation Partnership Project (3GPP) has officially established a research subject on a Long Term Evolution in unlicensed frequency bands (LTE-U) technology, and uses the free 5 GHz unlicensed frequency band to compensate for insufficient bandwidth of a licensed frequency band in an LTE technology. The 5 GHz unlicensed frequency band is used in both the Wi-Fi technology and the LTE-U technology. Generally, it is considered that the Wi-Fi technology and the LTE-U technology are solutions competing with each other. As shown in FIG. 1, an LTE-U base station supporting the LTE-U technology and a Wi-Fi access point (AP) supporting the Wi-Fi technology separately provide a wireless communications service for a terminal that supports a corresponding technology.

SUMMARY

Embodiments of the present invention disclose a signal transmission method and apparatus, so as to facilitate compatibility between an LTE-U technology and a Wi-Fi technology.

A first aspect of the embodiments of the present invention discloses a signal transmission apparatus. The apparatus includes a Long Term Evolution in unlicensed frequency bands (LTE-U) processing unit, a Wireless Fidelity (Wi-Fi) processing unit, and an antenna unit. The apparatus further includes a coupling apparatus. The coupling apparatus is connected to the LTE-U processing unit, the Wi-Fi processing unit, and the antenna unit. The coupling apparatus is configured to: divide an air interface signal received by the antenna unit into a first signal and a second signal, send the first signal to the LTE-U processing unit, and send the second signal to the Wi-Fi processing unit. The coupling apparatus is further configured to: receive an LTE-U signal sent by the LTE-U processing unit; divide the LTE-U signal into a first LTE-U signal and a second LTE-U signal; send the first LTE-U signal to the antenna unit, so that the antenna unit transmits the first LTE-U signal; and send the second LTE-U signal to the Wi-Fi processing unit, so that the Wi-Fi processing unit does not send a Wi-Fi signal. The coupling apparatus is further configured to: receive a Wi-Fi signal sent by the Wi-Fi processing unit; divide the Wi-Fi signal into a first Wi-Fi signal and a second Wi-Fi signal; send the first Wi-Fi signal to the antenna unit, so that the antenna unit transmits the first Wi-Fi signal; and send the second Wi-Fi signal to the LTE-U processing unit, so that the LTE-U processing unit does not send an LTE-U signal.

In a first possible implementation of the first aspect of the embodiments of the present invention, the coupling apparatus includes a first power splitter, a second power splitter, a third power splitter, and a fourth power splitter. A first end of the first power splitter is connected to a first end of the second power splitter. A second end of the first power splitter is connected to an output end of the LTE-U processing unit. A third end of the first power splitter is connected to an output end of the Wi-Fi processing unit. A second end of the second power splitter is connected to an input end of the antenna unit. A third end of the second power splitter is connected to a third end of the third power splitter. A second end of the third power splitter is connected to an output end of the antenna unit. A first end of the third power splitter is connected to a first end of the fourth power splitter. A second end of the fourth power splitter is connected to an input end of the LTE-U processing unit. A third end of the fourth power splitter is connected to an input end of the Wi-Fi processing unit.

With reference to the first aspect of the embodiments of the present invention, in a second possible implementation of the first aspect of the embodiments of the present invention, the coupling apparatus includes a first power splitter, a second power splitter, a first coupler, and a second coupler. A first end of the first power splitter is connected to a first end of the first coupler. A second end of the first power splitter is connected to an output end of the LTE-U processing unit. A third end of the first power splitter is connected to an output end of the Wi-Fi processing unit. A second end of the first coupler is connected to an input end of the antenna unit. A third end of the first coupler is connected to a third end of the second coupler. A first end of the second coupler is connected to an output end of the antenna unit. A second end of the second coupler is connected to a first end of the second power splitter. A second end of the second power splitter is connected to an input end of the LTE-U processing unit. A third end of the second power splitter is connected to an input end of the Wi-Fi processing unit.

With reference to the first aspect of the embodiments of the present invention, in a third possible implementation of the first aspect of the embodiments of the present invention, the coupling apparatus includes a first power splitter, a second power splitter, a third power splitter, a fourth power splitter, a fifth power splitter, and a sixth power splitter. A first end of the first power splitter is connected to an output end of the Wi-Fi processing unit. A second end of the first power splitter is connected to a second end of the second power splitter. A first end of the second power splitter is connected to an input end of the antenna unit. A third end of the first power splitter is connected to a third end of the fourth power splitter. A second end of the fourth power splitter is connected to a second end of the third power splitter. A first end of the third power splitter is connected to an output end of the antenna unit. A first end of the fourth power splitter is connected to an input end of the LTE-U processing unit. A first end of the sixth power splitter is connected to an output end of the LTE-U processing unit. A third end of the sixth power splitter is connected to a third end of the second power splitter. A second end of the sixth power splitter is connected to a second end of the fifth power splitter. A third end of the fifth power splitter is connected to a third end of the third power splitter. A first end of the fifth power splitter is connected to an input end of the Wi-Fi processing unit.

With reference to the first possible implementation of the first aspect of the embodiments of the present invention, in a fourth possible implementation of the first aspect of the embodiments of the present invention, the coupling apparatus further includes an attenuator, where an input end of the attenuator is connected to the third end of the second power splitter, and an output end of the attenuator is connected to the third end of the third power splitter.

With reference to the second possible implementation of the first aspect of the embodiments of the present invention, in a fifth possible implementation of the first aspect of the embodiments of the present invention, the coupling apparatus further includes an attenuator, where an input end of the attenuator is connected to the third end of the first coupler, and an output end of the attenuator is connected to the third end of the second coupler.

With reference to the third possible implementation of the first aspect of the embodiments of the present invention, in a sixth possible implementation of the first aspect of the embodiments of the present invention, the coupling apparatus further includes a first attenuator and a second attenuator. An input end of the first attenuator is connected to the third end of the first power splitter. An output end of the first attenuator is connected to the third end of the fourth power splitter. An input end of the second attenuator is connected to the second end of the sixth power splitter. An output end of the second attenuator is connected to the second end of the fifth power splitter.

A second aspect of the embodiments of the present invention discloses another signal transmission apparatus. The apparatus includes an LTE-U processing unit, a Wi-Fi processing unit, and an antenna unit. The apparatus further includes a coupling apparatus. The coupling apparatus is connected to the LTE-U processing unit, the Wi-Fi processing unit, and the antenna unit. The LTE-U processing unit is connected to the Wi-Fi processing unit. The coupling apparatus is configured to: divide an air interface signal received by the antenna unit into a first signal and a second signal, send the first signal to the LTE-U processing unit, and send the second signal to the Wi-Fi processing unit. The coupling apparatus is further configured to: receive an LTE-U signal sent by the LTE-U processing unit, and send the LTE-U signal to the antenna unit, so that the antenna unit transmits the LTE-U signal. The coupling apparatus is further configured to: receive a Wi-Fi signal sent by the Wi-Fi processing unit, and send the Wi-Fi signal to the antenna unit, so that the antenna unit transmits the Wi-Fi signal. The LTE-U processing unit is configured to: when needing to send the LTE-U signal to the coupling apparatus, send a first prompt message to the Wi-Fi processing unit, so that the Wi-Fi processing unit does not send a Wi-Fi signal. The Wi-Fi processing unit is configured to: when needing to send the Wi-Fi signal to the coupling apparatus, send a second prompt message to the LTE-U processing unit, so that the LTE-U processing unit does not send an LTE-U signal.

In a first possible implementation of the second aspect of the embodiments of the present invention, the coupling apparatus includes a first power splitter and a second power splitter. A first end of the first power splitter is connected to an input end of the antenna unit. A second end of the first power splitter is connected to an output end of the LTE-U processing unit. A third end of the first power splitter is connected to an output end of the Wi-Fi processing unit. A first end of the second power splitter is connected to an output end of the antenna unit. A second end of the second power splitter is connected to an input end of the LTE-U processing unit. A third end of the second power splitter is connected to an input end of the Wi-Fi processing unit.

A third aspect of the embodiments of the present invention discloses still another signal transmission apparatus. The apparatus includes an LTE-U processing unit, a Wi-Fi processing unit, and an antenna unit. The apparatus further includes a coupling apparatus and a control unit. The coupling apparatus is connected to the LTE-U processing unit, the Wi-Fi processing unit, the control unit, and the antenna unit. The control unit is connected to the LTE-U processing unit, the coupling apparatus, and the Wi-Fi processing unit. The coupling apparatus is configured to: divide an air interface signal received by the antenna unit into a first signal, a second signal, and a third signal; and send the first signal to the LTE-U processing unit, send the second signal to the Wi-Fi processing unit, and send the third signal to the control unit. The control unit is configured to: contend for a channel when detecting that the channel is idle, and when obtaining the channel by means of contention, control the LTE-U processing unit to send an LTE-U signal and control the Wi-Fi processing unit not to send a Wi-Fi signal, or control the Wi-Fi processing unit to send a Wi-Fi signal and control the LTE-U processing unit not to send an LTE-U signal. The coupling apparatus is further configured to: receive the LTE-U signal sent by the LTE-U processing unit, and send the LTE-U signal to the antenna unit, so that the antenna unit transmits the LTE-U signal. The coupling apparatus is further configured to: receive the Wi-Fi signal sent by the Wi-Fi processing unit, and send the Wi-Fi signal to the antenna unit, so that the antenna unit transmits the Wi-Fi signal.

In a first possible implementation of the third aspect of the embodiments of the present invention, the coupling apparatus includes a first power splitter and a second power splitter. A first end of the first power splitter is connected to an input end of the antenna unit. A second end of the first power splitter is connected to an output end of the LTE-U processing unit. A third end of the first power splitter is connected to an output end of the Wi-Fi processing unit. A first end of the second power splitter is connected to an output end of the antenna unit. A second end of the second power splitter is connected to an input end of the LTE-U processing unit. A third end of the second power splitter is connected to an input end of the Wi-Fi processing unit. A fourth end of the second power splitter is connected to an input end of the control unit.

A fourth aspect of the embodiments of the present invention discloses a signal transmission method. The method is applied to a signal transmission apparatus. The apparatus includes an antenna unit. The method includes: detecting whether a channel is idle; and transmitting, by the antenna unit, an LTE-U signal and a Wi-Fi signal in a time division multiplexing manner when the channel is idle. The method further includes: receiving, by the antenna unit, an air interface signal; and dividing the air interface signal into a first signal and a second signal.

In a first possible implementation of the fourth aspect of the embodiments of the present invention, the apparatus further includes a coupling apparatus. The transmitting, by the antenna unit, an LTE-U signal and a Wi-Fi signal in a time division multiplexing manner includes: when the LTE-U signal needs to be transmitted, dividing, by the coupling apparatus, the LTE-U signal into a first LTE-U signal and a second LTE-U signal, and transmitting, by the antenna unit, the first LTE-U signal, where the second LTE-U signal is used to instruct not to transmit the Wi-Fi signal; or when the Wi-Fi signal needs to be transmitted, dividing, by the coupling apparatus, the Wi-Fi signal into a first Wi-Fi signal and a second Wi-Fi signal, and transmitting, by the antenna unit, the first Wi-Fi signal, where the second Wi-Fi signal is used to instruct not to transmit the LTE-U signal.

With reference to the fourth aspect of the embodiments of the present invention, in a second possible implementation of the fourth aspect of the embodiments of the present invention, the apparatus further includes an LTE-U processing unit, a Wi-Fi processing unit, and a coupling apparatus. The transmitting, by the antenna unit, an LTE-U signal and a Wi-Fi signal in a time division multiplexing manner includes: when the LTE-U signal needs to be transmitted, sending, by the coupling apparatus, the LTE-U signal to the antenna unit; sending, by the LTE-U processing unit, a first prompt message to the Wi-Fi processing unit; and transmitting, by the antenna unit, the LTE-U signal, where the first prompt message is used to instruct the Wi-Fi processing unit not to send the Wi-Fi signal to the antenna unit; or when the Wi-Fi signal needs to be transmitted, sending, by the coupling apparatus, the Wi-Fi signal to the antenna unit; sending, by the Wi-Fi processing unit, a second prompt message to the LTE-U processing unit; and transmitting, by the antenna unit, the Wi-Fi signal, where the second prompt message is used to instruct the LTE-U processing unit not to send the LTE-U signal to the antenna unit.

With reference to the fourth aspect of the embodiments of the present invention, in a third possible implementation of the fourth aspect of the embodiments of the present invention, the apparatus further includes an LTE-U processing unit, a Wi-Fi processing unit, and a control unit. The transmitting, by the antenna unit, an LTE-U signal and a Wi-Fi signal in a time division multiplexing manner includes: when the LTE-U signal needs to be transmitted, controlling, by the control unit, the LTE-U processing unit to send the LTE-U signal to the antenna unit and controlling the Wi-Fi processing unit not to send a Wi-Fi signal to the antenna unit; and transmitting, by the antenna unit, the LTE-U signal; or when the Wi-Fi signal needs to be transmitted, controlling, by the control unit, the Wi-Fi processing unit to send the Wi-Fi signal to the antenna unit and controlling the LTE-U processing unit not to send an LTE-U signal to the antenna unit; and transmitting, by the antenna unit, the Wi-Fi signal.

With reference to the fourth aspect of the embodiments of the present invention, the first possible implementation of the fourth aspect of the embodiments of the present invention, the second possible implementation of the fourth aspect of the embodiments of the present invention, or the third possible implementation of the fourth aspect of the embodiments of the present invention, in a fourth possible implementation of the fourth aspect of the embodiments of the present invention, before the transmitting, by the antenna unit, an LTE-U signal and a Wi-Fi signal in a time division multiplexing manner when the channel is idle, the method further includes: determining whether the channel is obtained by means of contention; and when the channel is obtained by means of contention, performing the operation of transmitting, by the antenna unit, an LTE-U signal and a Wi-Fi signal in a time division multiplexing manner.

The signal transmission apparatus provided in the embodiments of the present invention includes the LTE-U processing unit, the Wi-Fi processing unit, the antenna unit, and the coupling apparatus. The antenna unit is configured to receive the air interface signal. The coupling apparatus is configured to: divide the air interface signal into the first signal and the second signal, send the first signal to the LTE-U processing unit, and send the second signal to the Wi-Fi processing unit. The coupling apparatus is further configured to: receive the LTE-U signal sent by the LTE-U processing unit; divide the LTE-U signal into the first LTE-U signal and the second LTE-U signal; send the first LTE-U signal to the antenna unit, so that the antenna unit transmits the first LTE-U signal; and send the second LTE-U signal to the Wi-Fi processing unit, so that the Wi-Fi processing unit does not send the Wi-Fi signal. The coupling apparatus is further configured to: receive the Wi-Fi signal sent by the Wi-Fi processing unit; divide the Wi-Fi signal into the first Wi-Fi signal and the second Wi-Fi signal; send the first Wi-Fi signal to the antenna unit, so that the antenna unit transmits the first Wi-Fi signal; and send the second Wi-Fi signal to the LTE-U processing unit, so that the LTE-U processing unit does not send the LTE-U signal. It can be learned that the embodiments of the present invention can provide an easily deployed signal transmission apparatus, so that an LTE-U technology is compatible with a Wi-Fi technology in a time division multiplexing manner, and the signal transmission apparatus is small in size and has low deployment costs.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following describes in detail the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The embodiments of the present invention disclose a signal transmission method and apparatus, so that both an LTE-U technology and a Wi-Fi technology can be supported, and the signal transmission apparatus is relatively small in size and has low deployment costs. The following separately provides descriptions in detail.

Figure 1:
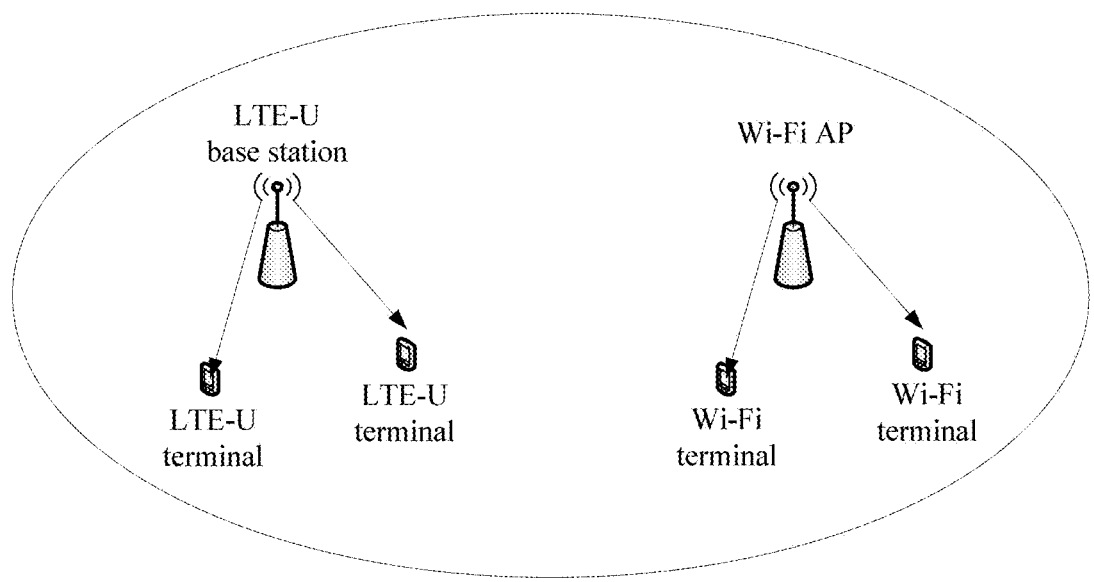
FIG. 1 is a schematic diagram of a scenario in which an LTE-U base station and a Wi-Fi access point provide a service for corresponding terminals in a current system.
Figure 2:
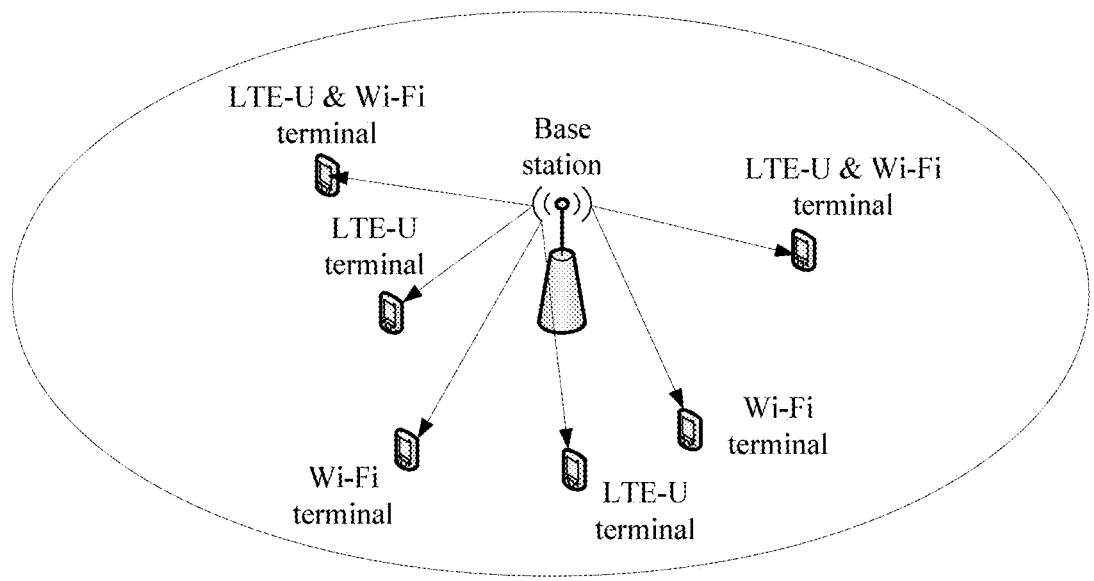
FIG. 2 is a schematic diagram of a scenario in which a base station that supports both an LTE-U technology and a Wi-Fi technology provides a service for a corresponding terminal according to an embodiment of the present invention.

FIG. 2 is a schematic diagram of a scenario in which a base station that supports both an LTE-U technology and a Wi-Fi technology provides a service for a corresponding terminal according to an embodiment of the present invention. As shown in FIG. 2, the base station that supports both the LTE-U technology and the Wi-Fi technology is provided with a signal transmission apparatus according to this embodiment of the present invention. The signal transmission apparatus includes an LTE-U processing unit, a Wi-Fi processing unit, an antenna unit, and a coupling apparatus. The base station that supports both the LTE-U technology and the Wi-Fi technology may provide a service for an LTE-U terminal, a Wi-Fi terminal, and an LTE-U & Wi-Fi terminal. The LTE-U & Wi-Fi terminal may also be provided with the signal transmission apparatus according to this embodiment of the present invention and including the LTE-U processing unit, the Wi-Fi processing unit, the antenna unit, and the coupling apparatus.

Figure 3:
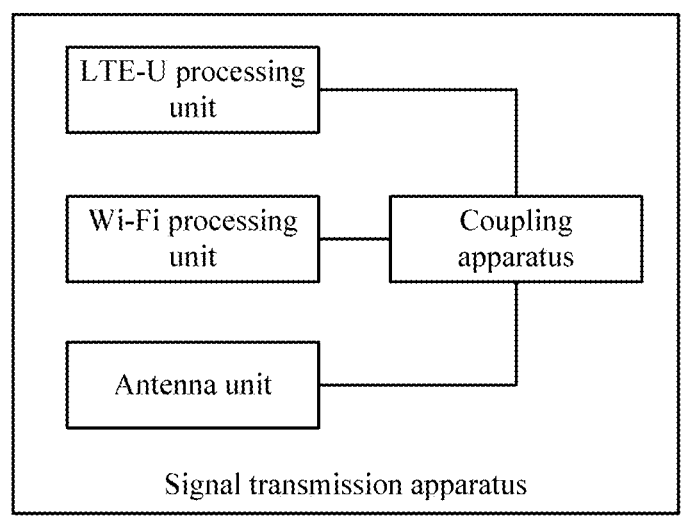
FIG. 3 is a schematic structural diagram of a signal transmission apparatus according to an embodiment of the present invention.

Referring to FIG. 3, FIG. 3 is a schematic structural diagram of a signal transmission apparatus according to an embodiment of the present invention. As shown in FIG. 3, the signal transmission apparatus may include an LTE-U processing unit, a Wi-Fi processing unit, an antenna unit, and a coupling apparatus. The coupling apparatus is connected to the LTE-U processing unit, the Wi-Fi processing unit, and the antenna unit.

The antenna unit is configured to: receive an air interface signal, and send the air interface signal to the coupling apparatus.

The antenna unit is further configured to: receive a signal (an LTE-U signal or a Wi-Fi signal) sent by the coupling apparatus, and transmit the signal.

The coupling apparatus is configured to: receive the air interface signal, divide the air interface signal into a first signal and a second signal, send the first signal to the LTE-U processing unit, and send the second signal to the Wi-Fi processing unit.

The coupling apparatus is further configured to: receive an LTE-U signal sent by the LTE-U processing unit; divide the LTE-U signal into a first LTE-U signal and a second LTE-U signal; send the first LTE-U signal to the antenna unit, so that the antenna unit transmits the first LTE-U signal; and send the second LTE-U signal to the Wi-Fi processing unit, so that the Wi-Fi processing unit does not send a Wi-Fi signal.

The coupling apparatus is further configured to: receive a Wi-Fi signal sent by the Wi-Fi processing unit; divide the Wi-Fi signal into a first Wi-Fi signal and a second Wi-Fi signal; send the first Wi-Fi signal to the antenna unit, so that the antenna unit transmits the first Wi-Fi signal; and send the second Wi-Fi signal to the LTE-U processing unit, so that the LTE-U processing unit does not send an LTE-U signal.

In this embodiment of the present invention, for example, a specific process in which the LTE-U processing unit sends the LTE-U signal to the coupling apparatus may be described as follows.

The LTE-U processing unit receives the first signal; determines whether a signal strength value of the first signal is less than or equal to a first preset signal strength threshold; when a result of the determining is yes, determines that a first channel is an idle channel, where the first channel is a channel on which the LTE-U signal is sent; when needing to send the LTE-U signal, contends for the first channel; and when obtaining the first channel by means of contention, sends the LTE-U signal to the coupling apparatus. A specific manner in which the LTE-U processing unit contends for the first channel may be: generating a random time, starting timing, and if the first channel is still an idle channel within a time period from a time at which the timing starts to the random time, obtaining the first channel by means of contention.

In this embodiment of the present invention, for example, a specific process in which the Wi-Fi processing unit sends the Wi-Fi signal to the coupling apparatus may be described as follows.

The Wi-Fi processing unit is configured to: receive the second signal; determine whether a signal strength value of the second signal is less than or equal to a second preset signal strength threshold; when a result of the determining is yes, determine that a second channel is an idle channel, where the second channel is a channel on which the Wi-Fi signal is sent; when needing to send the Wi-Fi signal, contend for the second channel; and when obtaining the second channel by means of contention, send the Wi-Fi signal to the coupling apparatus. A specific manner in which the Wi-Fi processing unit contends for the second channel is: generating a random time, starting timing, and if the second channel is still an idle channel within a time period from a time at which the timing starts to the random time, obtaining the second channel by means of contention.

It can be learned that, the signal transmission apparatus includes the LTE-U processing unit, the Wi-Fi processing unit, the antenna unit, and the coupling apparatus. The signal transmission apparatus is easily deployed in a base station or a mobile communications device. When the LTE-U processing unit sends the LTE-U signal, the Wi-Fi processing unit does not send the Wi-Fi signal, or when the Wi-Fi processing unit sends the Wi-Fi signal, the LTE-U processing unit does not send the LTE-U signal, so that the LTE-U technology is compatible with the Wi-Fi technology in a time division multiplexing manner, and an antenna unit can be saved. Therefore, the signal transmission apparatus is small in size and has low deployment costs.

In this embodiment of the present invention, the antenna unit may include a power amplifier, a low noise amplifier, a radio frequency switch, and an antenna.

The antenna is configured to: receive an air interface radio frequency signal, and when the radio frequency switch is in a receive mode, send the air interface radio frequency signal to the low noise amplifier. The low noise amplifier is configured to: amplify the air interface radio frequency signal received by the low noise amplifier and send the amplified air interface radio frequency signal to the coupling apparatus, so that the coupling apparatus divides the amplified air interface radio frequency signal into a first radio frequency signal and a second radio frequency signal. The power amplifier is configured to: receive the signal sent by the coupling apparatus and amplify power of the signal, and when the radio frequency switch is in a transmit mode, send the power-amplified signal to the antenna, so that the antenna transmits the power-amplified signal.

In this embodiment of the present invention, the LTE-U processing unit may include an LTE-U baseband processing unit and an LTE-U radio frequency processing unit.

The LTE-U radio frequency processing unit is configured to: receive the first radio frequency signal sent by the coupling apparatus, perform down-conversion processing on the first radio frequency signal to obtain a first baseband signal, and send the first baseband signal to the LTE-U baseband processing unit. The LTE-U baseband processing unit is configured to: receive the first baseband signal; determine whether a signal strength value of the first baseband signal is less than or equal to the first preset signal strength threshold; and if yes, determine that the first channel is an idle channel. The LTE-U baseband processing unit is further configured to: when needing to send an LTE-U signal, contend for the first channel; and after obtaining the first channel by means of contention, code and modulate the LTE-U signal into an LTE-U baseband signal, and send the LTE-U baseband signal to the LTE-U radio frequency processing unit. The LTE-U radio frequency processing unit is further configured to: perform up-conversion processing on the LTE-U baseband signal to obtain an LTE-U radio frequency signal, and send the LTE-U radio frequency signal to the coupling apparatus.

In this embodiment of the present invention, the Wi-Fi processing unit may include a Wi-Fi baseband processing unit and a Wi-Fi radio frequency processing unit.

The Wi-Fi radio frequency processing unit is configured to: receive the second radio frequency signal sent by the coupling apparatus, perform down-conversion processing on the second radio frequency signal to obtain a second baseband signal, and send the second baseband signal to the Wi-Fi baseband processing unit. The Wi-Fi baseband processing unit is configured to: receive the second baseband signal; determine whether a signal strength value of the second baseband signal is less than or equal to the second preset signal strength threshold; and if yes, determine that the second channel is an idle channel. The Wi-Fi baseband processing unit is further configured to: when needing to send a Wi-Fi signal, contend for the second channel; and after obtaining the second channel by means of contention, code and modulate the Wi-Fi signal into a Wi-Fi baseband signal, and send the Wi-Fi baseband signal to the Wi-Fi radio frequency processing unit. The Wi-Fi radio frequency processing unit is further configured to: perform up-conversion processing on the Wi-Fi baseband signal to obtain a Wi-Fi radio frequency signal, and send the Wi-Fi radio frequency signal to the coupling apparatus.

Figure 4:
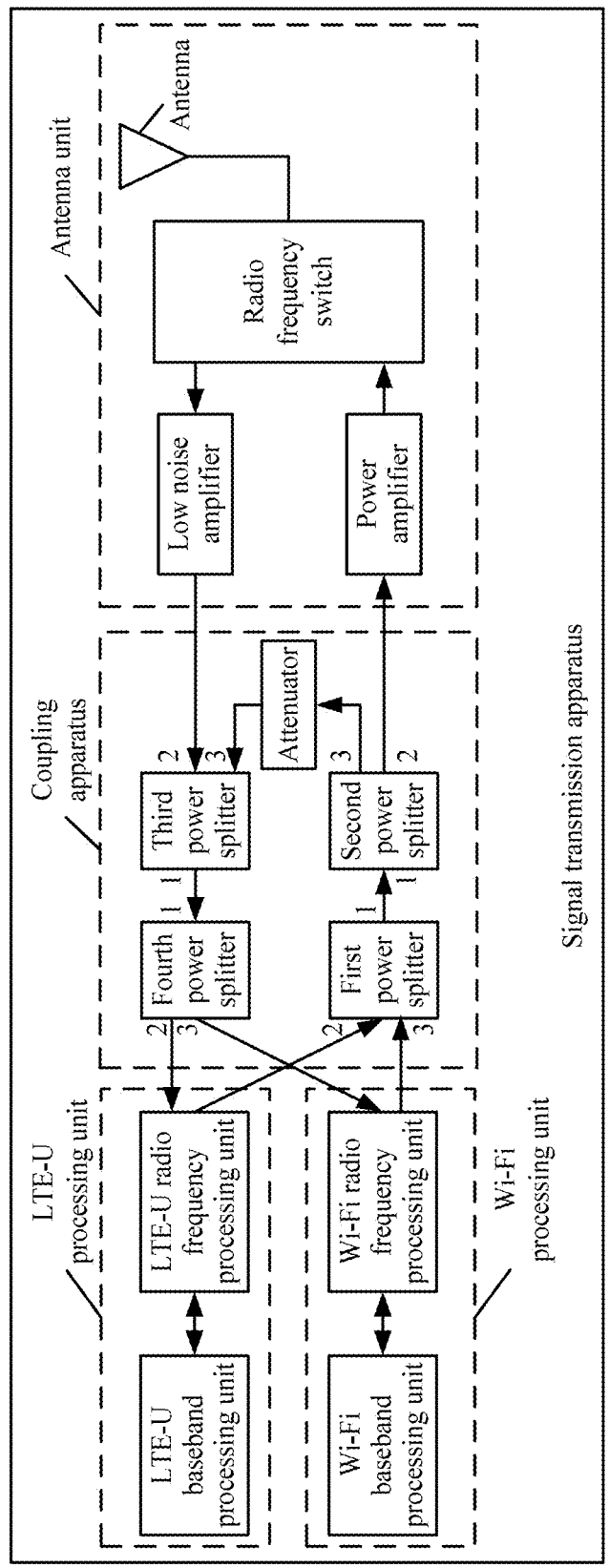
FIG. 4 is a schematic structural diagram of another signal transmission apparatus according to an embodiment of the present invention.

In an optional implementation, the coupling apparatus may include a first power splitter, a second power splitter, a third power splitter, a fourth power splitter, and an attenuator. In this case, a structure of the signal transmission apparatus may be shown in FIG. 4. FIG. 4 is a schematic structural diagram of another signal transmission apparatus according to an embodiment of the present invention.

A first end of the first power splitter is connected to a first end of the second power splitter. A second end of the first power splitter is connected to an output end of the LTE-U processing unit (that is, an output end of the LTE-U radio frequency processing unit). A third end of the first power splitter is connected to an output end of the Wi-Fi processing unit (that is, an output end of the Wi-Fi radio frequency processing unit). A second end of the second power splitter is connected to an input end of the antenna unit (that is, an input end of the power amplifier). A third end of the second power splitter is connected to an input end of the attenuator. An output end of the attenuator is connected to a third end of the third power splitter. A second end of the third power splitter is connected to an output end of the antenna unit (that is, an output end of the low noise amplifier). A first end of the third power splitter is connected to a first end of the fourth power splitter. A second end of the fourth power splitter is connected to an input end of the LTE-U processing unit (that is, an input end of the LTE-U radio frequency processing unit). A third end of the fourth power splitter is connected to an input end of the Wi-Fi processing unit (that is, an input end of the Wi-Fi radio frequency processing unit).

Specifically, an operating principle of the coupling apparatus in FIG. 4 is described as follows.

The third power splitter is configured to convert the air interface radio frequency signal from the low noise amplifier into a third radio frequency signal. The fourth power splitter is configured to: convert the third radio frequency signal into the first radio frequency signal and the second radio frequency signal, send the first radio frequency signal to the LTE-U radio frequency processing unit, and send the second radio frequency signal to the Wi-Fi radio frequency processing unit. The first power splitter is configured to convert the LTE-U radio frequency signal sent by the LTE-U radio frequency processing unit into a third LTE-U radio frequency signal. The second power splitter is configured to: convert the third LTE-U radio frequency signal into a fourth LTE-U radio frequency signal and the first LTE-U radio frequency signal that is sent to the power amplifier. The attenuator is configured to: attenuate signal strength of the fourth LTE-U radio frequency signal, and send the fourth LTE-U radio frequency signal having undergone signal strength attenuation to the third power splitter. The third power splitter is further configured to convert the fourth LTE-U radio frequency signal having undergone signal strength attenuation into a fifth LTE-U radio frequency signal. The fourth power splitter is further configured to: convert the fifth LTE-U radio frequency signal into the second LTE-U radio frequency signal, and send the second LTE-U radio frequency signal to the Wi-Fi radio frequency processing unit. The first power splitter is further configured to convert the Wi-Fi radio frequency signal sent by the Wi-Fi radio frequency processing unit into a third Wi-Fi radio frequency signal. The second power splitter is further configured to convert the third Wi-Fi radio frequency signal into a fourth Wi-Fi radio frequency signal and the first Wi-Fi radio frequency signal that is sent to the power amplifier. The attenuator may be further configured to: attenuate signal strength of the fourth Wi-Fi radio frequency signal, and send the fourth Wi-Fi radio frequency signal having undergone signal strength attenuation to the third power splitter. The third power splitter may be further configured to convert the fourth Wi-Fi radio frequency signal having undergone signal strength attenuation into a fifth Wi-Fi radio frequency signal. The fourth power splitter may be further configured to: convert the fifth Wi-Fi radio frequency signal into the second Wi-Fi radio frequency signal, and send the second Wi-Fi radio frequency signal to the LTE-U radio frequency processing unit. With the first power splitter, the second power splitter, the third power splitter, the fourth power splitter, and the attenuator, not only the signal transmission apparatus can send the LTE-U signal and the Wi-Fi signal, but also a power amplifier, a low noise amplifier, a radio frequency switch, and an antenna can be saved. Therefore, the signal transmission apparatus is small in size and has low deployment costs. In addition, the attenuator in FIG. 4 can prevent the Wi-Fi processing unit and the LTE-U processing unit from mutually receiving a signal that has relatively strong signal strength, reducing interference and preventing the signal transmission apparatus from being blocked or burned.

Figure 5:
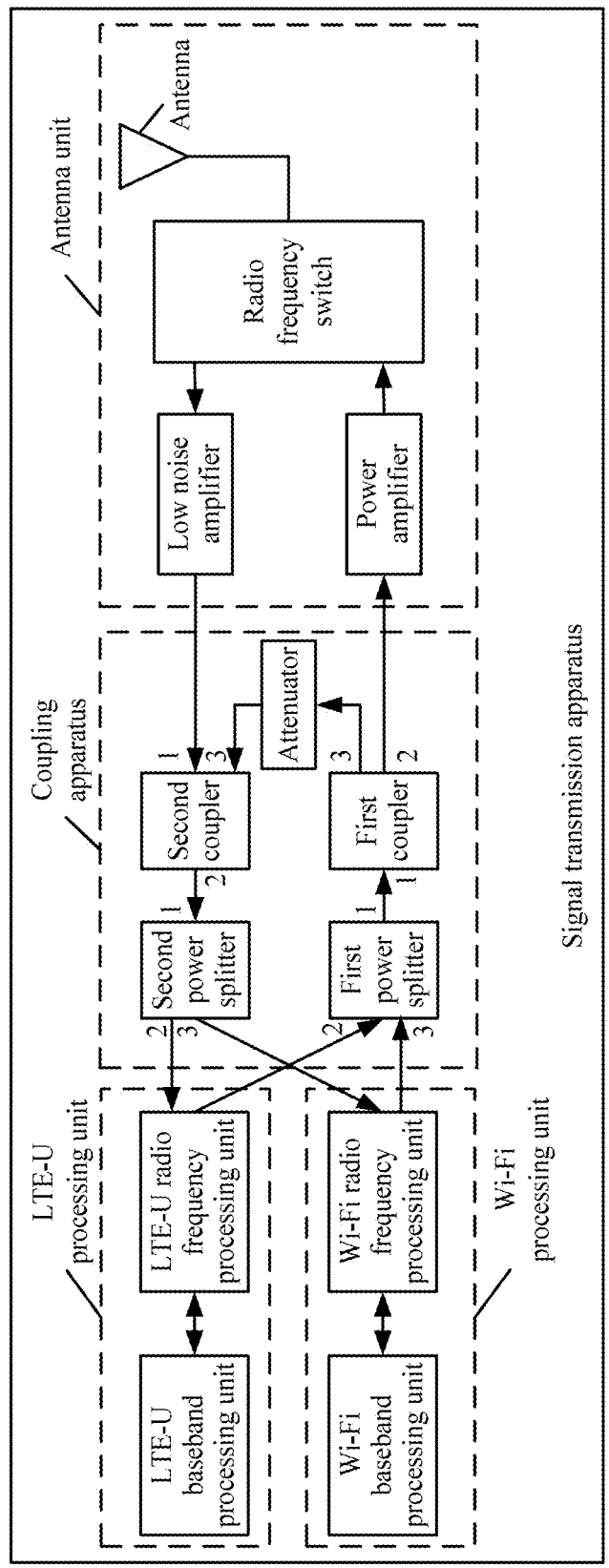
FIG. 5 is a schematic structural diagram of still another signal transmission apparatus according to an embodiment of the present invention.

In another optional implementation, the coupling apparatus may include a first power splitter, a second power splitter, a first coupler, a second coupler, and an attenuator. In this case, a structure of the signal transmission apparatus may be shown in FIG. 5. FIG. 5 is a schematic structural diagram of still another signal transmission apparatus according to an embodiment of the present invention.

A first end of the first power splitter is connected to a first end of the first coupler. A second end of the first power splitter is connected to an output end of the LTE-U processing unit (that is, an output end of the LTE-U radio frequency processing unit). A third end of the first power splitter is connected to an output end of the Wi-Fi processing unit (that is, an output end of the Wi-Fi radio frequency processing unit). A second end of the first coupler is connected to an input end of the antenna unit (that is, an input end of the power amplifier). A third end of the first coupler is connected to an input end of the attenuator. An output end of the attenuator is connected to a third end of the second coupler. A first end of the second coupler is connected to an output end of the antenna unit (that is, an output end of the low noise amplifier). A second end of the second coupler is connected to a first end of the second power splitter. A second end of the second power splitter is connected to an input end of the LTE-U processing unit (that is, an input end of the LTE-U radio frequency processing unit). A third end of the second power splitter is connected to an input end of the Wi-Fi processing unit (that is, an input end of the Wi-Fi radio frequency processing unit).

Specifically, an operating principle of the coupling apparatus in FIG. 5 is described as follows:

The second coupler is configured to convert the air interface radio frequency signal from the low noise amplifier into a third radio frequency signal. The second power splitter is configured to: convert the third radio frequency signal into the first radio frequency signal and the second radio frequency signal, send the first radio frequency signal to the LTE-U radio frequency processing unit, and send the second radio frequency signal to the Wi-Fi radio frequency processing unit. The first power splitter is configured to convert the LTE-U radio frequency signal sent by the LTE-U radio frequency processing unit into a third LTE-U radio frequency signal. The first coupler is configured to: convert the third LTE-U radio frequency signal into a fourth LTE-U radio frequency signal and the first LTE-U radio frequency signal that is sent to the power amplifier. The attenuator is configured to: attenuate signal strength of the fourth LTE-U radio frequency signal, and send the fourth LTE-U radio frequency signal having undergone signal strength attenuation to the second coupler. The second coupler may be further configured to convert the fourth LTE-U radio frequency signal having undergone signal strength attenuation into a fifth LTE-U radio frequency signal. The second power splitter may be further configured to: convert the fifth LTE-U radio frequency signal into the second LTE-U radio frequency signal, and send the second LTE-U radio frequency signal to the Wi-Fi radio frequency processing unit. The first power splitter is further configured to convert the Wi-Fi radio frequency signal sent by the Wi-Fi radio frequency processing unit into a third Wi-Fi radio frequency signal. The first coupler is further configured to convert the third Wi-Fi radio frequency signal into a fourth Wi-Fi radio frequency signal and the first Wi-Fi radio frequency signal that is sent to the power amplifier. The attenuator may be further configured to: attenuate signal strength of the fourth Wi-Fi radio frequency signal, and send the fourth Wi-Fi radio frequency signal having undergone signal strength attenuation to the second coupler. The second coupler may be further configured to convert the fourth Wi-Fi radio frequency signal having undergone signal strength attenuation into a fifth Wi-Fi radio frequency signal. The second power splitter may be further configured to: convert the fifth Wi-Fi radio frequency signal into the second Wi-Fi radio frequency signal, and send the second Wi-Fi radio frequency signal to the LTE-U radio frequency processing unit. With the first power splitter, the second power splitter, the first coupler, the second coupler, and the attenuator, not only the signal transmission apparatus can send the LTE-U signal and the Wi-Fi signal, but also a power amplifier, a low noise amplifier, a radio frequency switch, and an antenna can be saved. Therefore, the signal transmission apparatus is small in size and has low deployment costs. In addition, the attenuator in FIG. 5 can prevent the Wi-Fi processing unit and the LTE-U processing unit from mutually receiving a signal that has relatively strong signal strength, reducing interference and preventing the signal transmission apparatus from being blocked or burned.

Figure 6:
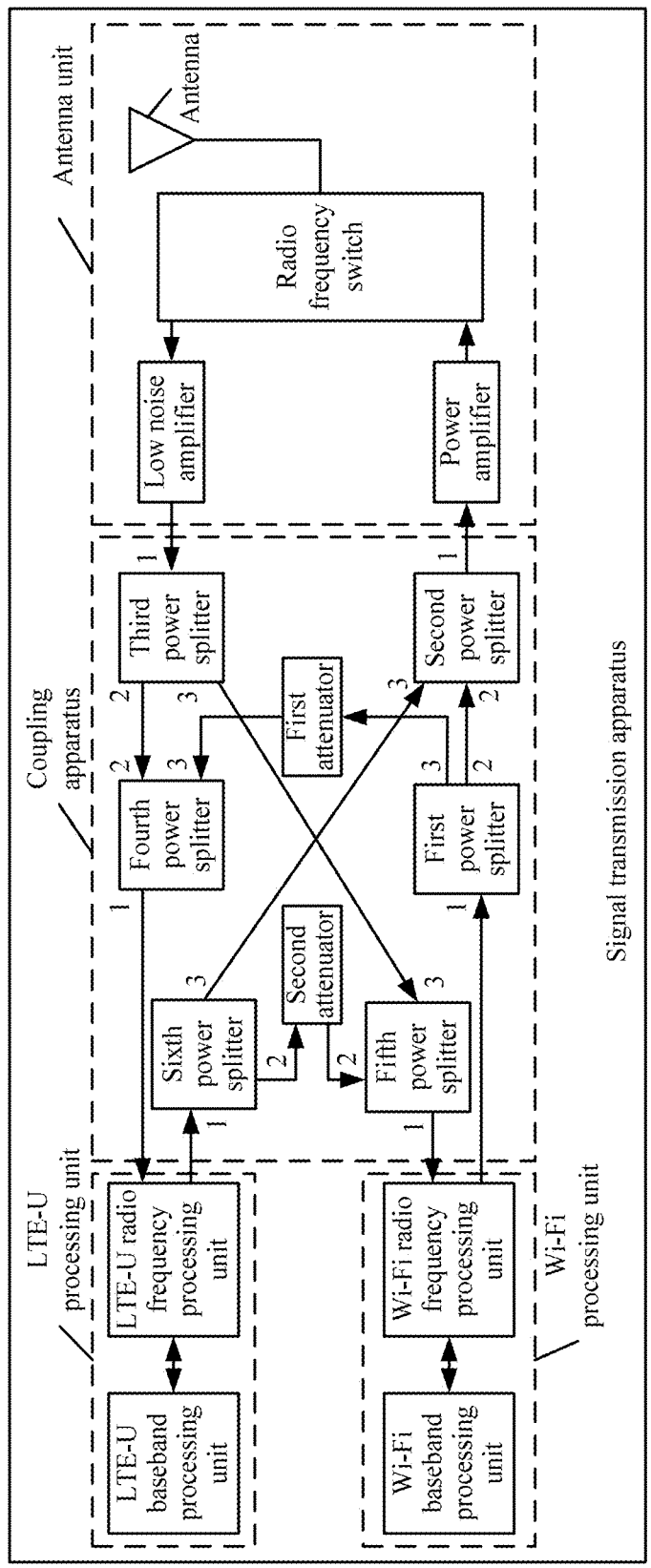
FIG. 6 is a schematic structural diagram of still another signal transmission apparatus according to an embodiment of the present invention.

In still another optional implementation, the coupling apparatus may include a first power splitter, a second power splitter, a third power splitter, a fourth power splitter, a fifth power splitter, a sixth power splitter, a first attenuator, and a second attenuator. In this case, a structure of the signal transmission apparatus may be shown in FIG. 6. FIG. 6 is a schematic structural diagram of still another signal transmission apparatus according to an embodiment of the present invention.

A first end of the first power splitter is connected to an output end of the Wi-Fi processing unit (that is, an output end of the Wi-Fi radio frequency processing unit). A second end of the first power splitter is connected to a second end of the second power splitter. A first end of the second power splitter is connected to an input end of the antenna unit (that is, an input end of the power amplifier). A third end of the first power splitter is connected to an input end of the first attenuator. An output end of the first attenuator is connected to a third end of the fourth power splitter. A second end of the fourth power splitter is connected to a second end of the third power splitter. A first end of the third power splitter is connected to an output end of the antenna unit (that is, an output end of the low noise amplifier). A first end of the fourth power splitter is connected to an input end of the LTE-U processing unit (that is, an input end of the LTE-U radio frequency processing unit). A first end of the sixth power splitter is connected to an output end of the LTE-U processing unit (that is, an output end of the LTE-U radio frequency processing unit). A third end of the sixth power splitter is connected to a third end of the second power splitter. A second end of the sixth power splitter is connected to an input end of the second attenuator. An output end of the second attenuator is connected to a second end of the fifth power splitter. A third end of the fifth power splitter is connected to a third end of the third power splitter. A first end of the fifth power splitter is connected to an input end of the Wi-Fi processing unit (that is, an input end of the Wi-Fi radio frequency processing unit).

Specifically, an operating principle of the coupling apparatus in FIG. 6 is described as follows.

The third power splitter is configured to convert the air interface radio frequency signal from the low noise amplifier into a third radio frequency signal and a fourth radio frequency signal. The fourth power splitter is configured to: convert the third radio frequency signal into the first radio frequency signal, and send the first radio frequency signal to the LTE-U radio frequency processing unit. The fifth power splitter is configured to: convert the fourth radio frequency signal into the second radio frequency signal, and send the second radio frequency signal to the Wi-Fi radio frequency processing unit. The sixth power splitter is configured to convert the LTE-U radio frequency signal sent by the LTE-U radio frequency processing unit into a third LTE-U radio frequency signal and a fourth LTE-U radio frequency signal. The second power splitter is configured to: convert the third LTE-U radio frequency signal into the first LTE-U radio frequency signal, and send the first LTE-U radio frequency signal to the power amplifier. The second attenuator is configured to attenuate signal strength of the fourth LTE-U radio frequency signal. The fifth power splitter may be further configured to: convert the fourth LTE-U radio frequency signal having undergone signal strength attenuation into the second LTE-U radio frequency signal, and send the second LTE-U radio frequency signal to the Wi-Fi radio frequency processing unit. The first power splitter is configured to convert the Wi-Fi radio frequency signal sent by the Wi-Fi radio frequency processing unit into a third Wi-Fi radio frequency signal and a fourth Wi-Fi radio frequency signal. The second power splitter may be further configured to: convert the third W-Fi radio frequency signal into the first Wi-Fi radio frequency signal, and send the first Wi-Fi radio frequency signal to the power amplifier. The first attenuator is configured to attenuate signal strength of the fourth Wi-Fi radio frequency signal. The fourth power splitter may be further configured to: convert the fourth Wi-Fi radio frequency signal having undergone signal strength attenuation into the second Wi-Fi radio frequency signal, and send the second Wi-Fi radio frequency signal to the LTE-U radio frequency processing unit. In this way, not only the signal transmission apparatus can send the LTE-U signal and the Wi-Fi signal, but also a power amplifier, a low noise amplifier, a radio frequency switch, and an antenna can be saved. Therefore, the signal transmission apparatus is small in size and has low deployment costs. In addition, the attenuators (the first attenuator and the second attenuator) in FIG. 6 can prevent the Wi-Fi processing unit and the LTE-U processing unit from mutually receiving a signal that has relatively strong signal strength, reducing interference and preventing the signal transmission apparatus from being blocked or burned.

Figure 7:
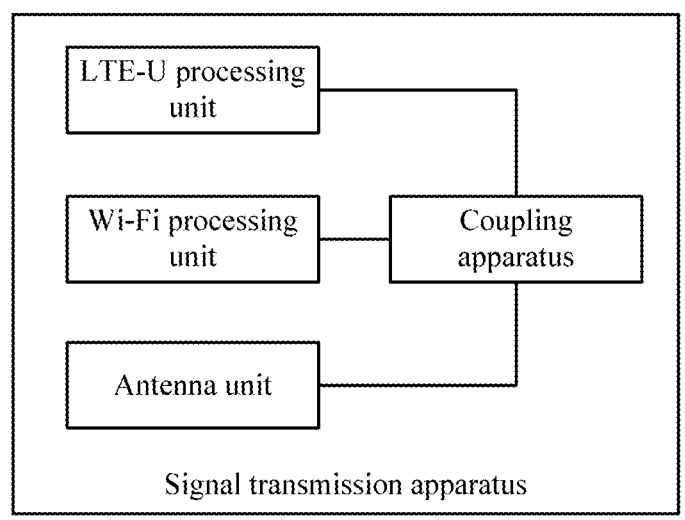
FIG. 7 is a schematic structural diagram of still another signal transmission apparatus according to an embodiment of the present invention.

Referring to FIG. 7, FIG. 7 is a schematic structural diagram of still another signal transmission apparatus according to an embodiment of the present invention. The signal transmission apparatus may include an LTE-U processing unit, a Wi-Fi processing unit, an antenna unit, and a coupling apparatus. The coupling apparatus is connected to the LTE-U processing unit, the Wi-Fi processing unit, and the antenna unit, and the LTE-U processing unit is connected to the Wi-Fi processing unit.

The antenna unit is configured to: receive an air interface signal, and send the air interface signal to the coupling apparatus.

The antenna unit is further configured to: receive a signal (an LTE-U signal or a Wi-Fi signal) sent by the coupling apparatus, and transmit the signal.

The coupling apparatus is configured to: receive the air interface signal, divide the air interface signal into a first signal and a second signal, send the first signal to the LTE-U processing unit, and send the second signal to the Wi-Fi processing unit.

The coupling apparatus is further configured to: receive an LTE-U signal sent by the LTE-U processing unit, and send the LTE-U signal to the antenna unit, so that the antenna unit transmits the LTE-U signal.

The coupling apparatus is further configured to: receive a Wi-Fi signal sent by the Wi-Fi processing unit, and send the Wi-Fi signal to the antenna unit, so that the antenna unit transmits the Wi-Fi signal.

Optionally, the first prompt information may be a start time at which a first channel is occupied, and the second prompt information may be a start time at which a second channel is occupied. This is not limited in this embodiment of the present invention.

The LTE-U processing unit is configured to: when needing to send the LTE-U signal to the coupling apparatus, send the first prompt message to the Wi-Fi processing unit, so that the Wi-Fi processing unit does not send a Wi-Fi signal.

The Wi-Fi processing unit is configured to: when needing to send the Wi-Fi signal to the coupling apparatus, send the second prompt message to the LTE-U processing unit, so that the LTE-U processing unit does not send an LTE-U signal.

In this embodiment of the present invention, for example, a specific process in which the LTE-U processing unit sends the LTE-U signal to the coupling apparatus may be described as follows:

The LTE-U processing unit receives the first signal; determines whether a signal strength value of the first signal is less than a first preset signal strength threshold; when a result of the determining is yes, determines that the first channel is an idle channel, where the first channel is a channel on which the LTE-U signal is sent; when needing to send the LTE-U signal, contends for the first channel; and when obtaining the first channel by means of contention, sends the LTE-U signal to the coupling apparatus. A specific manner in which the LTE-U processing unit contends for the first channel may be: generating a random time, starting timing, and if the first channel is still an idle channel within a time period from a time at which the timing starts to the random time, obtaining the first channel by means of contention.

In this embodiment of the present invention, for example, a specific process in which the Wi-Fi processing unit sends the Wi-Fi signal to the coupling apparatus may be described as follows.

The Wi-Fi processing unit receives the second signal; determines whether a signal strength value of the second signal is less than or equal to a second preset signal strength threshold; when a result of the determining is yes, determines that the second channel is an idle channel, where the second channel is a channel on which the Wi-Fi signal is sent; when needing to send the Wi-Fi signal, contends for the second channel; and when obtaining the second channel by means of contention, sends the Wi-Fi signal to the coupling apparatus. A specific manner in which the Wi-Fi processing unit contends for the second channel may be: generating a random time, starting timing, and if the second channel is still an idle channel within a time period from a time at which the timing starts to the random time, obtaining the second channel by means of contention.

It can be learned that, the signal transmission apparatus includes the LTE-U processing unit, the Wi-Fi processing unit, the antenna unit, and the coupling apparatus. The signal transmission apparatus is easily deployed in a base station or a mobile communications device. The LTE-U processing unit provides a notification for the Wi-Fi processing unit when sending the LTE-U signal, so that the Wi-Fi processing unit does not send the Wi-Fi signal; or the Wi-Fi processing unit provides a notification for LTE-U processing unit when sending the Wi-Fi signal, so that the LTE-U processing unit does not send the LTE-U signal. In this way, an LTE-U technology is compatible with a Wi-Fi technology in a time division multiplexing manner, and an antenna unit can be saved. Therefore, the signal transmission apparatus is small in size and has low deployment costs.

In this embodiment of the present invention, the antenna unit may include a power amplifier, a low noise amplifier, a radio frequency switch, and an antenna.

The antenna is configured to: receive an air interface radio frequency signal, and when the radio frequency switch is in a receive mode, send the air interface radio frequency signal to the low noise amplifier. The low noise amplifier is configured to: amplify the air interface radio frequency signal received by the low noise amplifier and send the amplified air interface radio frequency signal to the coupling apparatus, so that the coupling apparatus divides the amplified air interface radio frequency signal into a first radio frequency signal and a second radio frequency signal. The power amplifier is configured to: receive the signal sent by the coupling apparatus and amplify power of the signal, and when the radio frequency switch is in a transmit mode, send the power-amplified signal to the antenna, so that the antenna transmits the power-amplified signal.

In this embodiment of the present invention, the LTE-U processing unit may include an LTE-U baseband processing unit and an LTE-U radio frequency processing unit.

The LTE-U radio frequency processing unit is configured to: receive the first radio frequency signal sent by the coupling apparatus, perform down-conversion processing on the first radio frequency signal to obtain a first baseband signal, and send the first baseband signal to the LTE-U baseband processing unit. The LTE-U baseband processing unit is configured to: receive the first baseband signal; determine whether a signal strength value of the first baseband signal is less than or equal to the first preset signal strength threshold; and if yes, determine that the first channel is an idle channel. The LTE-U baseband processing unit is further configured to: when needing to send an LTE-U signal, contend for the first channel; and after obtaining the first channel by means of contention, send the first prompt information to the Wi-Fi processing unit, code and modulate the LTE-U signal into an LTE-U baseband signal, and send the LTE-U baseband signal to the LTE-U radio frequency processing unit. The LTE-U radio frequency processing unit is further configured to: perform up-conversion processing on the LTE-U baseband signal to obtain an LTE-U radio frequency signal, and send the LTE-U radio frequency signal to the coupling apparatus.

In this embodiment of the present invention, the Wi-Fi processing unit may include a Wi-Fi baseband processing unit and a Wi-Fi radio frequency processing unit.

The Wi-Fi radio frequency processing unit is configured to: receive the second radio frequency signal sent by the coupling apparatus, perform down-conversion processing on the second radio frequency signal to obtain a second baseband signal, and send the second baseband signal to the Wi-Fi baseband processing unit. The Wi-Fi baseband processing unit is configured to: receive the second baseband signal; determine whether a signal strength value of the second baseband signal is less than or equal to the second preset signal strength threshold; and if yes, determine that the second channel is an idle channel. The Wi-Fi baseband processing unit is further configured to: when needing to send a Wi-Fi signal, contend for the second channel; and after obtaining the second channel by means of contention, send the second prompt information to the LTE-U baseband processing unit, code and modulate the Wi-Fi signal into a Wi-Fi baseband signal, and send the Wi-Fi baseband signal to the Wi-Fi radio frequency processing unit. The Wi-Fi radio frequency processing unit is further configured to: perform up-conversion processing on the Wi-Fi baseband signal to obtain a Wi-Fi radio frequency signal, and send the Wi-Fi radio frequency signal to the coupling apparatus.

Figure 8:
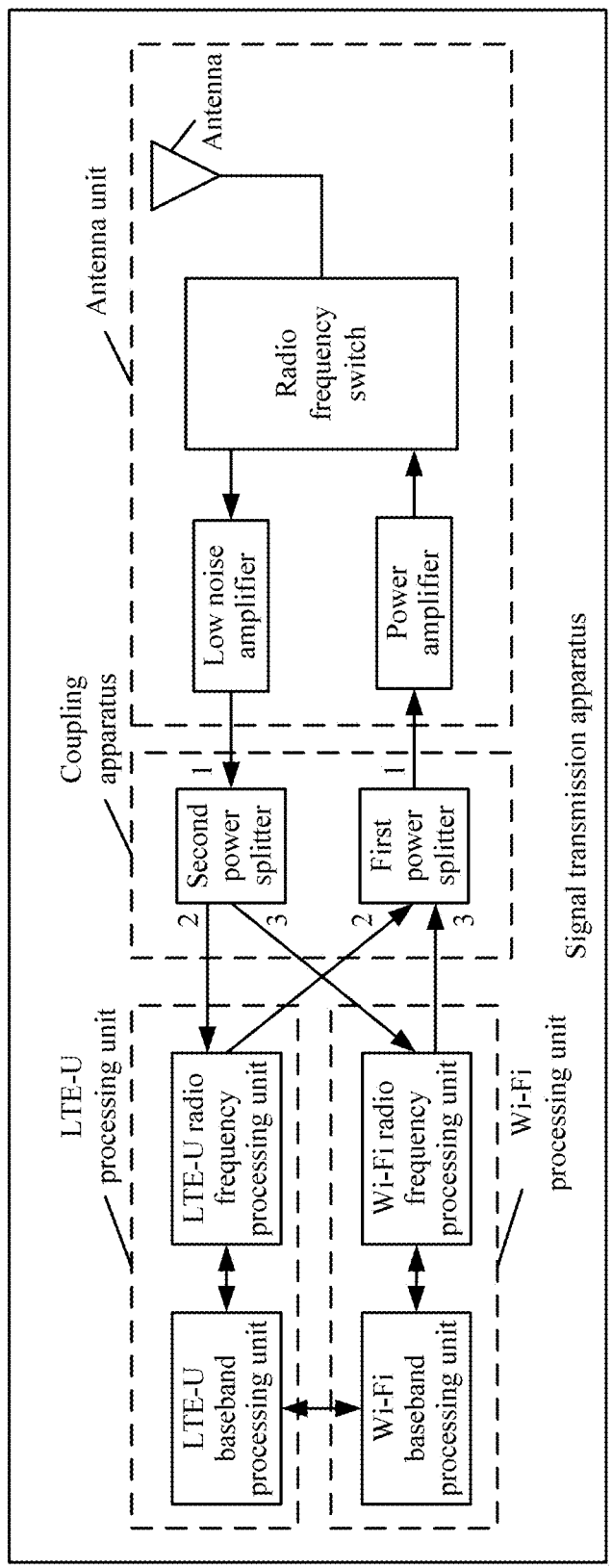
FIG. 8 is a schematic structural diagram of still another signal transmission apparatus according to an embodiment of the present invention.

In another optional implementation, the coupling apparatus may include a first power splitter and a second power splitter. In this case, a structure of the signal transmission apparatus may be shown in FIG. 8. FIG. 8 is a schematic structural diagram of still another signal transmission apparatus according to an embodiment of the present invention.

A first end of the first power splitter is connected to an input end of the antenna unit (that is, an input end of the power amplifier). A second end of the first power splitter is connected to an output end of the LTE-U processing unit (that is, an output end of the LTE-U radio frequency processing unit). A third end of the first power splitter is connected to an output end of the Wi-Fi processing unit (that is, an output end of the Wi-Fi baseband processing unit). A first end of the second power splitter is connected to an output end of the antenna unit (that is, an output end of the low noise amplifier). A second end of the second power splitter is connected to an input end of the LTE-U processing unit (that is, an input end of the LTE-U radio frequency processing unit). A third end of the second power splitter is connected to an input end of the Wi-Fi processing unit (that is, an input end of the Wi-Fi baseband processing unit).

Specifically, an operating principle of the coupling apparatus in FIG. 8 is described as follows:

The second power splitter is configured to: convert the air interface radio frequency signal sent by the low noise amplifier into the first radio frequency signal and the second radio frequency signal, and send the first radio frequency signal to the LTE-U radio frequency processing unit, and send the second radio frequency signal to the Wi-Fi radio frequency processing unit. The first power splitter is configured to: convert the LTE-U radio frequency signal sent by the LTE-U radio frequency processing unit into a first LTE-U radio frequency signal, and send the first LTE-U radio frequency signal to the power amplifier. The first power splitter is further configured to: convert the Wi-Fi radio frequency signal sent by the Wi-Fi radio frequency processing unit into a first Wi-Fi radio frequency signal, and send the first Wi-Fi radio frequency signal to the power amplifier. With the first power splitter and the second power splitter, the signal transmission apparatus can send the LTE-U signal and the Wi-Fi signal; and in addition, the LTE-U processing unit can provide a notification for the Wi-Fi processing unit when sending the LTE-U radio frequency signal, so that the Wi-Fi processing unit does not send the Wi-Fi radio frequency signal; and the Wi-Fi processing unit can provide a notification for the LTE-U processing unit when sending the Wi-Fi radio frequency signal, so that the LTE-U processing unit does not send the LTE-U radio frequency signal. In this way, an LTE-U technology is compatible with a Wi-Fi technology in a time division multiplexing manner, and a power amplifier, a low noise amplifier, a radio frequency switch, and an antenna can be saved. Therefore, the signal transmission apparatus is small in size and has low deployment costs. In addition, the LTE-U processing unit and the Wi-Fi processing unit cannot mutually receive a signal, avoiding a case in which the signal transmission apparatus is blocked or burnt due to mutual receiving of a signal that has relatively strong signal strength, achieving high security, and reducing interference.

Figure 9:
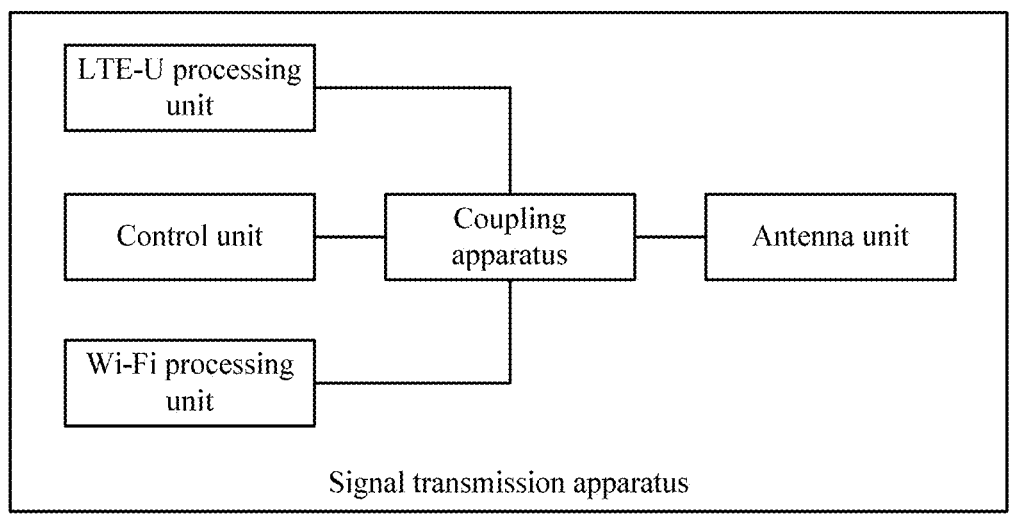
FIG. 9 is a schematic structural diagram of still another signal transmission apparatus according to an embodiment of the present invention.

Referring to FIG. 9, FIG. 9 is a schematic structural diagram of still another signal transmission apparatus according to an embodiment of the present invention. As shown in FIG. 9, the signal transmission apparatus may include an LTE-U processing unit, a Wi-Fi processing unit, an antenna unit, a control unit, and a coupling apparatus. The coupling apparatus is connected to the LTE-U processing unit, the Wi-Fi processing unit, the control unit, and the antenna unit. The control unit is connected to the LTE-U processing unit, the Wi-Fi processing unit, and the coupling apparatus.

The antenna unit is configured to: receive an air interface signal, and send the air interface signal to the coupling apparatus.

The antenna unit is further configured to: receive a signal (an LTE-U signal or a Wi-Fi signal) sent by the coupling apparatus, and transmit the signal.

The coupling apparatus is configured to: divide the air interface signal sent by the antenna unit into a first signal, a second signal, and a third signal; and send the first signal to the LTE-U processing unit, send the second signal to the Wi-Fi processing unit, and send the third signal to the control unit.

The control unit is configured to: contend for a channel when detecting that the channel is idle, and when obtaining the channel by means of contention, control the LTE-U processing unit to send an LTE-U signal and control the Wi-Fi processing unit not to send a Wi-Fi signal, or control the Wi-Fi processing unit to send a Wi-Fi signal and control the LTE-U processing unit not to send an LTE-U signal. A specific manner in which the control unit detects that the channel is idle may be: determining whether a signal strength value of the third signal is less than or equal to a preset signal strength threshold, and when a result of the determining is yes, determining that the channel is idle. A specific manner in which the control unit contends for the channel may be: generating a random time, starting timing, and if the channel is still an idle channel within a time period from a time at which the timing starts to the random time, obtaining the channel by means of contention. After obtaining the channel by means of contention, the control unit may determine, according to a preset selection rule, a signal that needs to be sent. That is, when controlling the LTE-U processing unit to send the LTE-U signal, the control unit controls the Wi-Fi processing unit not to send the Wi-Fi signal; or when controlling the Wi-Fi processing unit to send the Wi-Fi signal, the control unit controls the LTE-U processing unit not to send the LTE-U signal. The preset selection rule may be a random selection rule, a priority selection rule (that is, a signal that carries a service having a higher priority is preferentially selected), or a delay selection rule (that is, a signal that carries a service having a higher delay requirement is preferentially selected). This is not limited in this embodiment of the present invention.

The coupling apparatus is further configured to: receive the LTE-U signal sent by the LTE-U processing unit, and send the LTE-U signal to the antenna unit, so that the antenna unit transmits the LTE-U signal.

The coupling apparatus is further configured to: receive the Wi-Fi signal sent by the Wi-Fi processing unit, and send the Wi-Fi signal to the antenna unit, so that the antenna unit transmits the Wi-Fi signal.

In this embodiment of the present invention, the antenna unit may include a power amplifier, a low noise amplifier, a radio frequency switch, and an antenna.

The antenna is configured to: receive an air interface radio frequency signal, and when the radio frequency switch is in a receive mode, send the air interface radio frequency signal to the low noise amplifier. The low noise amplifier is configured to: amplify the air interface radio frequency signal received by the low noise amplifier and send the amplified air interface radio frequency signal to the coupling apparatus, so that the coupling apparatus divides the amplified air interface radio frequency signal into a first radio frequency signal, a second radio frequency signal, and a third radio frequency signal. The power amplifier is configured to: receive the signal sent by the coupling apparatus and amplify power of the signal, and when the radio frequency switch is in a transmit mode, send the power-amplified signal to the antenna, so that the antenna transmits the power-amplified signal.

In this embodiment of the present invention, the LTE-U processing unit may include an LTE-U baseband processing unit and an LTE-U radio frequency processing unit.

The LTE-U radio frequency processing unit is configured to: receive the first radio frequency signal sent by the coupling apparatus, perform down-conversion processing on the first radio frequency signal to obtain a first baseband signal, and send the first baseband signal to the LTE-U baseband processing unit. The LTE-U baseband processing unit is configured to receive the first baseband signal. The LTE-U baseband processing unit is further configured to: under control of the control unit, code and modulate the LTE-U signal into an LTE-U baseband signal, and send the LTE-U baseband signal to the LTE-U radio frequency processing unit. The LTE-U radio frequency processing unit is further configured to: perform up-conversion processing on the LTE-U baseband signal to obtain an LTE-U radio frequency signal, and send the LTE-U radio frequency signal to the coupling apparatus.

In this embodiment of the present invention, the Wi-Fi processing unit may include a Wi-Fi baseband processing unit and a Wi-Fi radio frequency processing unit.

The Wi-Fi radio frequency processing unit is configured to: receive the second radio frequency signal sent by the coupling apparatus, perform down-conversion processing on the second radio frequency signal to obtain a second baseband signal, and send the second baseband signal to the Wi-Fi baseband processing unit. The Wi-Fi baseband processing unit is configured to receive the second baseband signal. The Wi-Fi baseband processing unit is further configured to: under control of the control unit, code and modulate the Wi-Fi signal into a Wi-Fi baseband signal, and send the Wi-Fi baseband signal to the Wi-Fi radio frequency processing unit. The Wi-Fi radio frequency processing unit is further configured to: perform up-conversion processing on the Wi-Fi baseband signal to obtain a Wi-Fi radio frequency signal, and send the Wi-Fi radio frequency signal to the coupling apparatus.

Figure 10:
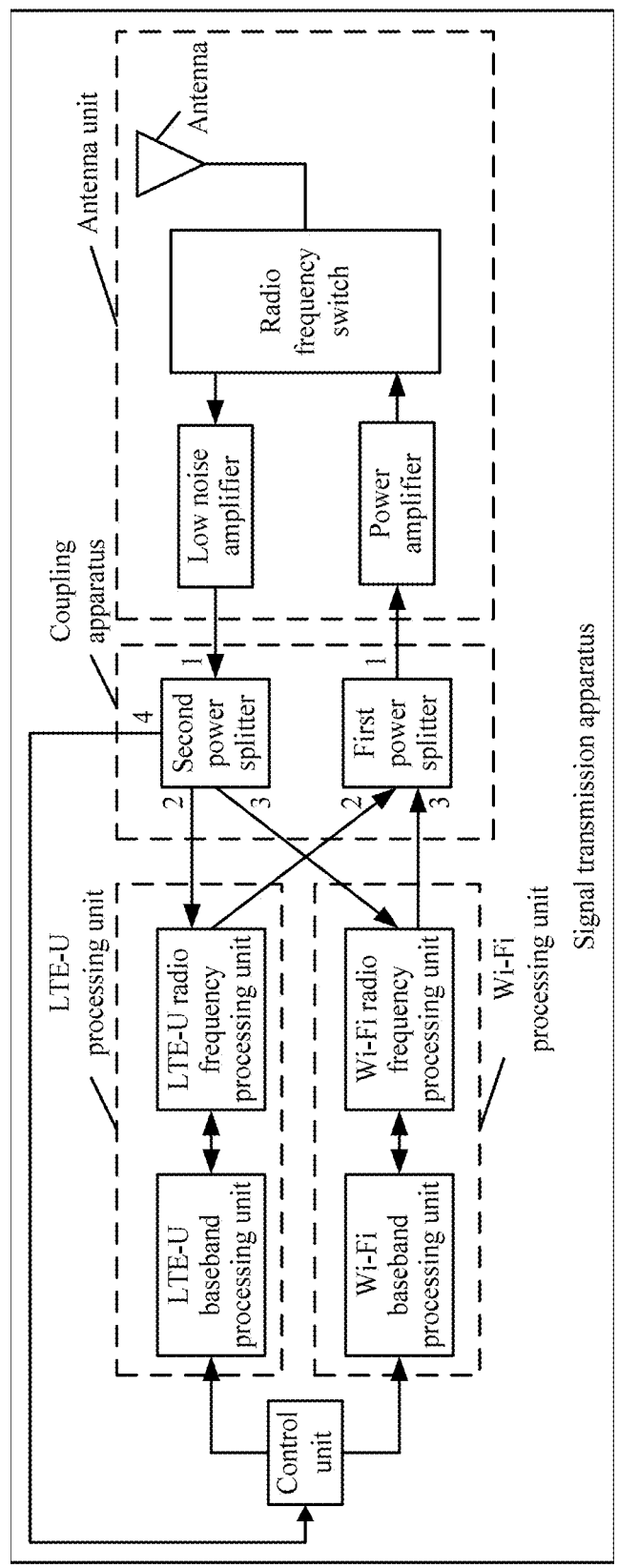
FIG. 10 is a schematic structural diagram of still another signal transmission apparatus according to an embodiment of the present invention.

In an optional implementation, the coupling apparatus may include a first power splitter and a second power splitter. In this case, a structure of the signal transmission apparatus may be shown in FIG. 10. FIG. 10 is a schematic structural diagram of still another signal transmission apparatus according to an embodiment of the present invention.

A first end of the first power splitter is connected to an input end of the antenna unit (that is, an input end of the power amplifier). A second end of the first power splitter is connected to an output end of the LTE-U processing unit (that is, an output end of the LTE-U radio frequency processing unit). A third end of the first power splitter is connected to an output end of the Wi-Fi processing unit (that is, an output end of the Wi-Fi radio frequency processing unit). A first end of the second power splitter is connected to an output end of the antenna unit (that is, an output end of the low noise amplifier). A second end of the second power splitter is connected to an input end of the LTE-U processing unit (that is, an input end of the LTE-U radio frequency processing unit). A third end of the second power splitter is connected to an input end of the Wi-Fi processing unit (that is, an input end of the Wi-Fi radio frequency processing unit). A fourth end of the second power splitter is connected to an input end of the control unit.

Specifically, an operating principle of the coupling apparatus in FIG. 10 is described as follows.

The second power splitter converts the air interface radio frequency signal from the low noise amplifier into the first radio frequency signal, the second radio frequency signal, and the third radio frequency signal, sends the first radio frequency signal to the LTE-U radio frequency processing unit, sends the second radio frequency signal to the Wi-Fi radio frequency processing unit, and sends the third radio frequency signal to the control unit. The first power splitter receives a first radio frequency signal sent by the LTE-U radio frequency processing unit or the Wi-Fi radio frequency processing unit, converts the first radio frequency signal into a second radio frequency signal, and sends the second radio frequency signal to the power amplifier.

It can be learned that, according to the signal transmission apparatus provided in this embodiment of the present invention, an LTE-U technology can be compatible with a Wi-Fi technology in a time division multiplexing manner, and the signal transmission apparatus is small in size and has low deployment costs. In addition, the LTE-U processing unit and the Wi-Fi processing unit cannot mutually receive a signal, avoiding a case in which the signal transmission apparatus is blocked or burnt due to mutual receiving of a signal that has relatively strong signal strength, achieving high security, and reducing interference.

Figure 11:
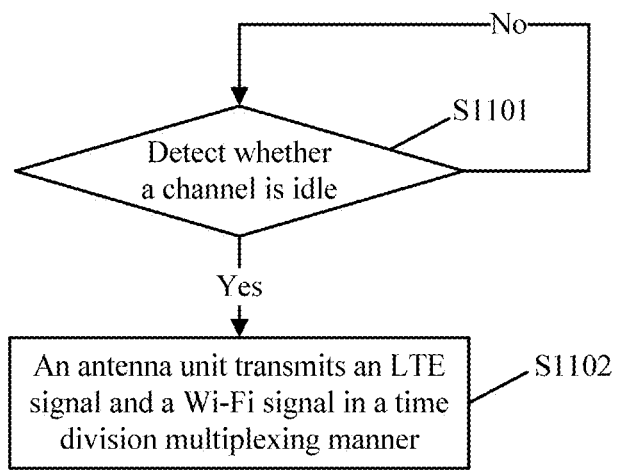
FIG. 11 is a schematic flowchart of a signal transmission method according to an embodiment of the present invention.

Referring to FIG. 11, FIG. 11 is a schematic flowchart of a signal transmission method according to an embodiment of the present invention. The method shown in FIG. 11 may be applied to a signal transmission apparatus, and the signal transmission apparatus may include an antenna unit. As shown in FIG. 11, the signal processing method may include the following steps.

S1101: Detect whether a channel is idle.

In this embodiment of the present invention, when a detection result in step S1101 is yes, step S1102 is executed; or when a detection result in step S1101 is no, step S1101 may continue to be executed.

S1102: When the channel is idle, an antenna unit transmits an LTE-U signal and a Wi-Fi signal in a time division multiplexing manner.

In this embodiment of the present invention, that an antenna unit transmits an LTE-U signal and a Wi-Fi signal in a time division multiplexing manner means that: the Wi-Fi signal is not transmitted when the LTE-U signal is transmitted, and the LTE-U signal is not transmitted when the Wi-Fi signal is transmitted.

The signal transmission method may further include receiving an air interface signal, and dividing the air interface signal into a first signal and a second signal.

Optionally, when the channel is idle, before step S1102 is executed, the following operation may be further executed: determining whether the channel is obtained by means of contention, and when the channel is obtained by means of contention, executing the operation of transmitting, by an antenna unit, an LTE-U signal and a Wi-Fi signal in a time division multiplexing manner.

In an optional implementation, the signal transmission apparatus may further include an LTE-U processing unit, a Wi-Fi processing unit, and a coupling apparatus. In this case, that an antenna unit transmits an LTE-U signal and a Wi-Fi signal in a time division multiplexing manner may include: when the LTE-U signal needs to be transmitted, the coupling apparatus divides the LTE-U signal that needs to be transmitted by the LTE-U processing unit into a first LTE-U signal and a second LTE-U signal, the antenna unit transmits the first LTE-U signal, and the coupling apparatus sends the second LTE-U signal to the Wi-Fi processing unit, where the second LTE-U signal is used to instruct the Wi-Fi processing unit not to send the Wi-Fi signal to the antenna unit; or when the Wi-Fi signal needs to be transmitted, the coupling apparatus divides the Wi-Fi signal that needs to be transmitted by the Wi-Fi processing unit into a first Wi-Fi signal and a second Wi-Fi signal, the antenna unit transmits the first Wi-Fi signal, and the coupling apparatus sends the second Wi-Fi signal to the LTE-U processing unit, where the second Wi-Fi signal is used to instruct the LTE-U processing unit not to send the LTE-U signal to the antenna unit.

In another optional implementation, the apparatus may further include an LTE-U processing unit, a Wi-Fi processing unit, and a coupling apparatus. In this case, that an antenna unit transmits an LTE-U signal and a Wi-Fi signal in a time division multiplexing manner may include: when the LTE-U signal needs to be transmitted, the coupling apparatus sends, to the antenna unit, the LTE-U signal that needs to be transmitted, the LTE-U processing unit sends a first prompt message to the Wi-Fi processing unit, and the antenna unit transmits the LTE-U signal, where the first prompt message is used to instruct the Wi-Fi processing unit to not to send the Wi-Fi signal to the antenna unit; or when the Wi-Fi signal needs to be transmitted, the coupling apparatus sends, to the antenna unit, the Wi-Fi signal that needs to be transmitted, the Wi-Fi processing unit sends a second prompt message to the LTE-U processing unit, and the antenna unit transmits the Wi-Fi signal, where the second prompt message is used to instruct the LTE-U processing unit to not to send the LTE-U signal to the antenna unit.

In still another optional implementation, the apparatus may further include an LTE-U processing unit, a Wi-Fi processing unit, and a control unit. In this case, that an antenna unit transmits an LTE-U signal and a Wi-Fi signal in a time division multiplexing manner may include: when the LTE-U signal needs to be transmitted, the control unit controls the LTE-U processing unit to send, to the antenna unit, the LTE-U signal that needs to be transmitted and controls the Wi-Fi processing unit not to send the Wi-Fi signal to the antenna unit, and the antenna unit transmits the LTE-U signal that needs to be transmitted; or when the Wi-Fi signal needs to be transmitted, the control unit controls the Wi-Fi processing unit to send, to the antenna unit, the Wi-Fi signal that needs to be transmitted and controls the LTE-U processing unit not to send the LTE-U signal to the antenna unit, and the antenna unit transmits the Wi-Fi signal.

It can be learned that, by implementing this embodiment of the present invention, a Wi-Fi technology can be compatible with an LTE-U technology in a time division multiplexing manner, and an antenna unit can be saved for the signal transmission apparatus. Therefore, a size and deployment costs of the signal transmission apparatus are reduced.

It should be noted that, in the foregoing embodiments, the description of each embodiment has respective focuses. For a part that is not described in detail in an embodiment, reference may be made to related descriptions in other embodiments. In addition, a person skilled in the art should also understand that the embodiments described in this specification all belong to example embodiments, and the related actions and units are not necessarily mandatory to the present invention.

A sequence of the steps of the method in the embodiments of the present invention may be adjusted, and some steps may be merged or removed according to an actual need.

A person of ordinary skill in the art may understand that all or some of the steps of the methods in the embodiments may be implemented by a program instructing relevant hardware. The program may be stored in a computer readable storage medium. The storage medium may include a flash memory, a read-only memory (ROM), a random access memory (RAM), a magnetic disk, an optical disc, or the like.

The foregoing details the signal transmission method and apparatus provided in the embodiments of the present invention. The principle and implementations of the present invention are described herein by using specific examples. The description about the foregoing embodiments is merely provided to help understand the method and the core idea of the present invention. In addition, a person of ordinary skill in the art can make variations to the specific implementations and application scope based on the idea of the present invention. Therefore, the content of this specification shall not be construed as limitations on the present invention.

What is claimed is:

1. An apparatus, comprising:
   an antenna apparatus;
   one or more Long Term Evolution in unlicensed frequency bands (LTE-U) processors configured to: when needing to transmit LTE-U signals, contend to obtain a first channel that is idle, and after obtaining the first channel by contention, transmit, to a coupling apparatus, a LTE-U signal that is to be transmitted by the antenna apparatus over the first channel obtained by contention;
   one or more Wireless Fidelity (Wi-Fi) processors configured to: when needing to transmit Wi-Fi signals, contend to obtain a second channel that is idle, and after obtaining the second channel by contention, transmit, to the coupling apparatus, a Wi-Fi signal that is to be transmitted by the antenna apparatus over the second channel obtained by contention; and
   the coupling apparatus comprising at least one power splitter, the coupling apparatus connecting the one or more LTE-U processors and the one or more Wi-Fi processors to the antenna apparatus, wherein the coupling apparatus is configured to:
   divide an air interface signal received by the antenna apparatus into a first signal and a second signal,
   send the first signal to the one or more LTE-U processors, and send the second signal to the one or more Wi-Fi processors;
   receive, from the one or more LTE-U processors, the LTE-U signal that is to be transmitted by the antenna apparatus over the first channel obtained by contention;
   upon receiving, from the one or more LTE-U processors, the LTE-U signal to be transmitted by the antenna apparatus over the first channel obtained by contention:
      divide the LTE-U signal into a first LTE-U signal and a second LTE-U signal;
      send the first LTE-U signal to the antenna apparatus, so that the antenna apparatus transmits the first LTE-U signal over the first channel; and
      send the second LTE-U signal to the one or more Wi-Fi processors, to prompt the one or more Wi-Fi processors to not send any Wi-Fi signals to the coupling apparatus during reception of the second LTE-U signal by the one or more Wi-Fi processors;
   receive, from the one or more Wi-Fi processors, the Wi-Fi signal that is to be transmitted by the antenna apparatus over the second channel obtained by contention; and
   upon receiving, from the one or more Wi-Fi processors, the Wi-Fi signal to be transmitted by the antenna apparatus over the second channel obtained by contention:
      divide the Wi-Fi signal into a first Wi-Fi signal and a second Wi-Fi signal;
      send the first Wi-Fi signal to the antenna apparatus, so that the antenna apparatus transmits the first Wi-Fi signal; and
      send the second Wi-Fi signal to the one or more LTE-U processors, to prompt the one or more LTE-U processors to not send any LTE-U signals to the coupling apparatus during reception of the second Wi-Fi signal by the one or more LTE-U processors.

2. The apparatus according to claim 1, wherein the coupling apparatus comprises:
   a first power splitter;
   a second power splitter;
   a third power splitter; and
   a fourth power splitter;
   wherein a first end of the first power splitter is connected to a first end of the second power splitter, a second end of the first power splitter is connected to an output end of the one or more LTE-U processors, and a third end of the first power splitter is connected to an output end of the one or more Wi-Fi processors;
   wherein a second end of the second power splitter is connected to an input end of the antenna apparatus, and a third end of the second power splitter is connected to a third end of the third power splitter; and
   wherein a second end of the third power splitter is connected to an output end of the antenna apparatus, a first end of the third power splitter is connected to a first end of the fourth power splitter, a second end of the fourth power splitter is connected to an input end of the one or more LTE-U processors, and a third end of the fourth power splitter is connected to an input end of the one or more Wi-Fi processors.

3. The apparatus according to claim 2, wherein the coupling apparatus further comprises an attenuator, an input end of the attenuator being connected to the third end of the second power splitter, and an output end of the attenuator being connected to the third end of the third power splitter.

4. The apparatus according to claim 1, wherein the coupling apparatus comprises:
a first power splitter;
a second power splitter;
a first coupler; and
a second coupler;
wherein a first end of the first power splitter is connected to a first end of the first coupler, a second end of the first power splitter is connected to an output end of the one or more LTE-U processors, and a third end of the first power splitter is connected to an output end of the one or more Wi-Fi processors,
wherein a second end of the first coupler is connected to an input end of the antenna apparatus, and a third end of the first coupler is connected to a third end of the second coupler;
wherein a first end of the second coupler is connected to an output end of the antenna apparatus, and a second end of the second coupler is connected to a first end of the second power splitter; and
wherein a second end of the second power splitter is connected to an input end of the one or more LTE-U processors, and a third end of the second power splitter is connected to an input end of the one or more Wi-Fi processors.

5. The apparatus according to claim 4, wherein the coupling apparatus further comprises an attenuator, an input end of the attenuator being connected to the third end of the first coupler, and an output end of the attenuator being connected to the third end of the second coupler.

6. The apparatus according to claim 1, wherein the coupling apparatus comprises:
a first power splitter;
a second power splitter;
a third power splitter;
a fourth power splitter;
a fifth power splitter; and
a sixth power splitter;
wherein a first end of the first power splitter is connected to an output end of the one or more Wi-Fi processors, a second end of the first power splitter is connected to a second end of the second power splitter, and a third end of the first power splitter is connected to a third end of the fourth power splitter;
wherein a first end of the second power splitter is connected to an input end of the antenna apparatus;
wherein a first end of the fourth power splitter is connected to an input end of the one or more LTE-U processors, and a second end of the fourth power splitter is connected to a second end of the third power splitter;
wherein a first end of the third power splitter is connected to an output end of the antenna apparatus;
wherein a first end of the sixth power splitter is connected to an output end of the one or more LTE-U processors, a third end of the sixth power splitter is connected to a third end of the second power splitter, and a second end of the sixth power splitter is connected to a second end of the fifth power splitter; and
wherein a third end of the fifth power splitter is connected to a third end of the third power splitter, and a first end of the fifth power splitter is connected to an input end of the one or more Wi-Fi processors.

7. The apparatus according to claim 6, wherein the coupling apparatus further comprises a first attenuator and a second attenuator, wherein an input end of the first attenuator is connected to the third end of the first power splitter, an output end of the first attenuator is connected to the third end of the fourth power splitter, an input end of the second attenuator is connected to the second end of the sixth power splitter, and an output end of the second attenuator is connected to the second end of the fifth power splitter.

8. The apparatus according to claim 1, wherein the antenna apparatus includes a power amplifier, a low noise amplifier, a radio frequency switch, and an antenna.

9. The apparatus according to claim 1, wherein the one or more LTE-U processors comprise an LTE-U baseband processor and an LTE-U radio frequency processor.

10. The apparatus according to claim 1, wherein the one or more Wi-Fi processors comprise a Wi-Fi baseband processor and a Wi-Fi radio frequency processor.

11. An apparatus, comprising:
an antenna apparatus;
one or more LTE-U processors configured to: when needing to transmit LTE-U signals, contend to obtain a first channel that is idle, and after obtaining the first channel by contention, send, to a coupling apparatus, a LTE-U signal that is to be transmitted by the antenna apparatus over the first channel obtained by contention;
one or more Wi-Fi processors, wherein the one or more LTE-U processors are connected to the one or more Wi-Fi processors, the one or more Wi-Fi processors configured to: when needing to transmit Wi-Fi signals, contend to obtain a second channel that is idle, and after obtaining the second channel by contention, send, to the coupling apparatus, a Wi-Fi signal that is to be transmitted by the antenna apparatus over the second channel obtained by contention; and
the coupling apparatus comprising at least one power splitter, the coupling apparatus being connected to the one or more LTE-U processors, the one or more Wi-Fi processors, and the antenna apparatus, wherein the coupling apparatus is configured to:
divide an air interface signal received by the antenna apparatus into a first signal and a second signal;
send the first signal to the one or more LTE-U processors;
send the second signal to the one or more Wi-Fi processors;
receive, from the one or more LTE-U processors, the LTE-U signal to be transmitted by the antenna apparatus over the first channel obtained by contention; and
send the LTE-U signal to the antenna apparatus, so that the antenna apparatus transmits the LTE-U signal over the first channel obtained by contention;
receive, from the one or more Wi-Fi processors, the Wi-Fi signal to be transmitted by the antenna apparatus over the second channel obtained by contention and send the Wi-Fi signal to the antenna apparatus, so that the antenna apparatus transmits the Wi-Fi signal over the second channel obtained by contention;
wherein the one or more LTE-U processors are configured to:
when sending the LTE-U signal to the coupling apparatus for transmission by the antenna apparatus over the first channel obtained by contention, send a first prompt message to the one or more Wi-Fi processors, prompting the one or more Wi-Fi processors to not attempt to send any Wi-Fi signals during sending of the LTE-U signal by the one or more LTE-U processors; and wherein the one or more Wi-Fi processors are configured to:

when sending the Wi-Fi signal to the coupling apparatus for transmission by the antenna apparatus over the second channel obtained by contention, send a second prompt message to the one or more LTE-U processors, prompting the one or more LTE-U processors to not attempt to send any LTE-U signals during sending of the Wi-Fi signal by the one or more Wi-Fi processors.

12. The apparatus according to claim 11, wherein the coupling apparatus comprises:

a first power splitter; and a second power splitter; and wherein a first end of the first power splitter is connected to an input end of the antenna apparatus, a second end of the first power splitter is connected to an output end of the one or more LTE-U processors, and a third end of the first power splitter is connected to an output end of the one or more Wi-Fi processors; and wherein a first end of the second power splitter is connected to an output end of the antenna apparatus, a second end of the second power splitter is connected to an input end of the one or more LTE-U processors, and a third end of the second power splitter is connected to an input end of the one or more Wi-Fi processors.

13. The apparatus according to claim 11, wherein the antenna apparatus includes a power amplifier, a low noise amplifier, a radio frequency switch, and an antenna.

14. The apparatus according to claim 11, wherein the one or more LTE-U processors comprise an LTE-U baseband processor and an LTE-U radio frequency processor.

15. The apparatus according to claim 11, wherein the one or more Wi-Fi processors comprise a Wi-Fi baseband processor and a Wi-Fi radio frequency processor.

16. An apparatus, comprising:

a LTE-U processor configured to: when needing to transmit LTE-U signals, contend to obtain a first channel that is idle, and after obtaining the first channel by contention, transmit, to a coupling apparatus, a first LTE-U signal that is to be transmitted by an antenna apparatus over the first channel obtained by contention;

a Wi-Fi processor configured to: when needing to transmit Wi-Fi signals, contend to obtain a second channel that is idle, and after obtaining the second channel by contention, transmit, to the coupling apparatus, a first Wi-Fi signal that is to be transmitted by the antenna apparatus over the second channel obtained by contention;

the antenna apparatus;

the coupling apparatus connecting the LTE-U processor to the antenna apparatus, and connecting the Wi-Fi processor to the antenna apparatus, wherein the coupling apparatus is configured to:

upon receipt, from the LTE-U processor, of the first LTE-U signal that is to be transmitted by the antenna apparatus over the first channel obtained by contention:

divide the first LTE-U signal into a second LTE-U signal and a third LTE-U signal, and send the second LTE-U signal to the antenna apparatus for transmission of the second LTE-U signal, and send the third LTE-U signal to the Wi-Fi processor prompting the Wi-Fi processor not to send a Wi-Fi signal to the coupling apparatus during reception of the third LTE-U signal by the Wi-Fi processor; and upon receipt, from the Wi-Fi processor, of the first Wi-Fi signal that is to be transmitted by the antenna apparatus over the second channel obtained by contention:

divide the first Wi-Fi signal into a second Wi-Fi signal and a third Wi-Fi signal, and send the second Wi-Fi signal to the antenna apparatus for transmission of the second Wi-Fi signal, and send the third Wi-Fi signal to the LTE-U processor prompting the LTE-U processor not to send a LTE-U signal to the coupling apparatus during reception of the third Wi-Fi signal by the LTE-U processor.

17. The apparatus according to claim 16, wherein the antenna apparatus includes a power amplifier, a low noise amplifier, a radio frequency switch, and an antenna.

18. The apparatus according to claim 16, wherein the LTE-U processor comprises an LTE-U baseband processor and an LTE-U radio frequency processor.

19. The apparatus according to claim 16, wherein the Wi-Fi processor comprises a Wi-Fi baseband processor and a Wi-Fi radio frequency processor.

20. The apparatus according to claim 16, wherein the coupling apparatus comprises:

a first power splitter;

a second power splitter;

a first coupler; and a second coupler;

wherein a first end of the first power splitter is connected to a first end of the first coupler, a second end of the first power splitter is connected to an output end of the LTE-U processor, and a third end of the first power splitter is connected to an output end of the Wi-Fi processor, wherein a second end of the first coupler is connected to an input end of the antenna apparatus, and a third end of the first coupler is connected to a third end of the second coupler;

wherein a first end of the second coupler is connected to an output end of the antenna apparatus, and a second end of the second coupler is connected to a first end of the second power splitter; and wherein a second end of the second power splitter is connected to an input end of the LTE-U processor, and a third end of the second power splitter is connected to an input end of the Wi-Fi processor.

* * * * *